UNITED STATES PATENT OFFICE.

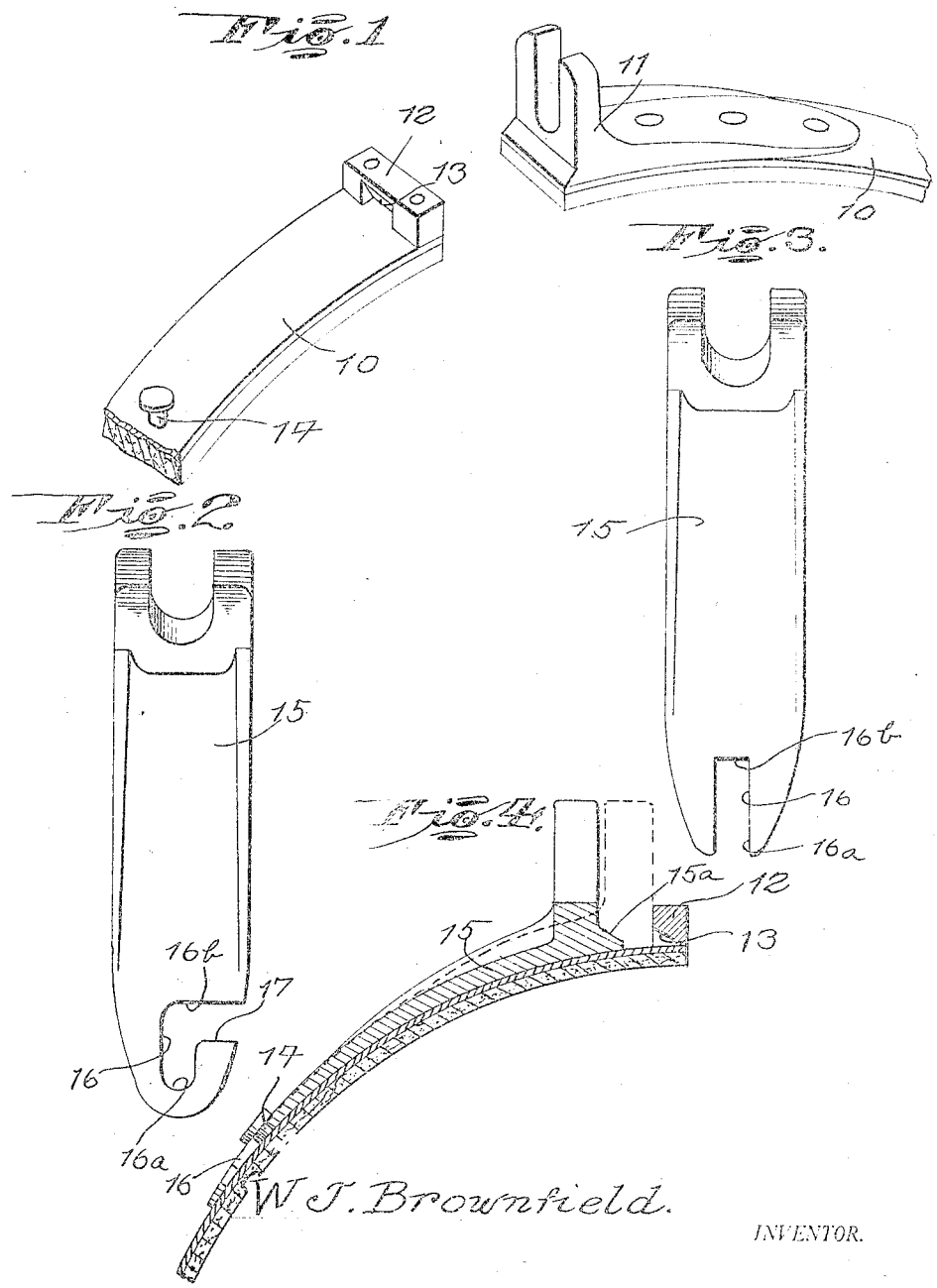

WALTER J. BROWNFIELD, OF ST. LOUIS, MISSOURI.

TRANSMISSION BAND.

1,406,440.  Specification of Letters Patent.  Patented Feb. 14, 1922.

Application filed March 26, 1921. Serial No. 455,925.

*To all whom it may concern:*

Be it known that I, WALTER J. BROWNFIELD, a citizen of the United States, residing at St. Louis, in the State of Missouri, have invented certain new and useful Improvements in Transmission Bands, of which the following is a specification, reference being had to the accompanying drawings.

This invention relates to improvements in transmission bands, and more particularly to the manner of mounting the ears of the transmission band upon a band.

An important object of the invention is to provide a readily disengageable mounting for one of the ears of the transmission band. In many cars the ears on the transmission bands prevent the removal of the bands for renewal of their gripping surfaces by reason of the fact that not sufficient play is provided to permit of removal of the bands while the ears are attached thereto.

In accordance with my invention one of the ears of the transmission bands is made removable so as to permit withdrawal of the bands without removal of the transmission or any portion thereof.

Other objects and advantages of the invention will become apparent throughout the course of the following description.

In the accompanying drawings wherein for the purpose of illustration are shown preferred embodiments of my invention and wherein like reference characters designate like parts throughout:

Figure 1 is a fragmentary perspective of the adjacent ends of a transmission bearing constructed in accordance with my invention;

Figure 2 is a plan view of one form of removable ear;

Figure 3 is a plan view of a second form, and

Figure 4 is a longitudinal sectional view showing a removable ear mounted upon a transmission band and in position for removal in solid lines.

Referring now more particularly to the drawings, the numeral 10 indicates a transmission band provided at one end with an engaging ear 11 which is permanently secured thereto. The opposite end of the band has secured thereto a stop or shoulder member 12 provided in its face with a slot 13 for a purpose presently to appear. Secured to the band at a point spaced from the stop or shoulder member 12 a distance slightly less than the length of the removable ear is a headed pin 14.

The numeral 15 designates the removable ear which is provided upon its inner face or that face next adjacent to the stationary ear 11, when the ear is in position upon the band, with a lug 15ª adapted to enter the groove 13 of the shoulder member 12. The removable ear 15 is provided at its other end with a longitudinally extending slot 16 adapted for the reception of the headed pin 14 but not permitting the passage of the head thereof. This slot is of such length that when the pin 14 is disposed adjacent the rear end of the slot, as indicated at 16ª, the lug 15ª is in engagement with the groove 13 and the ear is accordingly held against displacement. When, however, the ear 15 is slid upon the band 10 so as to bring the pin 14 to the inner end 16ᵇ of the slot, the lug 15ª is withdrawn from the slot and the ear may be removed from the band. The manner of removing the band in the two forms shown is slightly different but the same principle of construction is involved. In the form shown in Figure 2, the forward end 16ᵇ of the slot 16 is provided with an angular extension 17 opening through the side of the ear, and the ear may accordingly be disengaged from the pin 14 by removing the slotted end thereof transversely. In the form shown in Figure 3, the ear is removed by shifting the end thereof to clear the shoulder 12 and withdraw the same from the pin longitudinally.

From the foregoing it is believed to be obvious that I have constructed a transmission band which is particularly well adapted for use by reason of the facility with which the ear thereof may be removed, and it will furthermore be obvious that the constructions hereinabove set forth are merely preferred embodiments of my invention and are capable of some change and modification without departing from the spirit of my invention. I accordingly do not limit myself to the specific construction as hereinabove set forth except as hereinafter claimed.

What I claim is:

The combination with a transmission band provided at one end thereof with a shoulder, the shoulder having a slot formed therein, of a removable ear having a lug adapted to enter said slot, a headed pin secured to the band at a point spaced from the shoulder a distance less than the length of the ear, and a longitudinal slot formed in the ear and receiving said pin below the head thereof, said slot being of such length that when said pin is disposed in one end thereof, said lug is in engagement with the slot of said shoulder, and when the pin is in the opposite end thereof the lug is freed from engagement with said slot, the last named end of the slot being provided with an angular extension opening from the side of the ear.

In testimony whereof I hereunto affix my signature.

WALTER J. BROWNFIELD.